(12) United States Patent
Kelley et al.

(10) Patent No.: US 8,060,352 B2
(45) Date of Patent: Nov. 15, 2011

(54) GEOSPATIAL MODELING SYSTEM USING VOID FILLING AND RELATED METHODS

(75) Inventors: Patrick Kelley, Palm Bay, FL (US); Mark Rahmes, Melbourne, FL (US); Harlan Yates, Melbourne, FL (US); Josef De Vaughn Allen, Melbourne, FL (US); Eric Spellman, Viera, FL (US)

(73) Assignee: Harris Corporation, Melbourne, FL (US)

( * ) Notice: Subject to any disclaimer, the term of this patent is extended or adjusted under 35 U.S.C. 154(b) by 791 days.

(21) Appl. No.: 11/874,299

(22) Filed: Oct. 18, 2007

(65) Prior Publication Data

US 2009/0106000 A1    Apr. 23, 2009

(51) Int. Cl.
    *G06G 7/48*    (2006.01)
    *G06K 9/00*    (2006.01)
(52) U.S. Cl. ............................................. 703/6; 382/109
(58) Field of Classification Search ....... 703/6; 382/109
    See application file for complete search history.

(56) References Cited

U.S. PATENT DOCUMENTS

| | | | |
|---|---|---|---|
| 6,654,690 B2 | 11/2003 | Rahmes et al. | 705/5 |
| 6,748,121 B2 | 6/2004 | Kim et al. | 382/300 |
| 6,987,520 B2 | 1/2006 | Criminisi et al. | 345/629 |

OTHER PUBLICATIONS

Grohman, Filling SRTW Voids: The Delta Surface Fill Model, Photogrammetric Engineering and Remote Sensing, Mar. 2006, pp. 216-216.*
Lehner et al, "HydroSHEDS Technical Documentation Version 1.0", May 2006, 27 pages.*
Gousie, M. B. *Digital Elevation Model Error Detection and Visualization*, The 4th Workshop on Dynamic & Multi-dimensional GIS (Pontypridd, Wales, UK, 2005), C. Gold, Ed., ISPRS, pp. 42-46.
Grohman et al., *Filling SRTM Voids: The Delta Surface Fill Model*, Photogrammetric Engineering and Remote Sensing, Mar. 2006, pp. 213-216.
Criminisi et al., *Region Filling Object Removal by Exemplar-Based Image Inpainting*, IEEE Transactions on Image Processing, vol. 13, No. 9, Sep. 2004.
Gooch et al., *Failure Prediction in Automatically Generated Digital Elevation Models*, Special issue on GeoComp 99- GeoComputation and the Geosciences, vol. 27, Issue 8, Oct. 2001, pp. 913-920.
Criminisi et al., "Object removal by exemplar-based inpainting", IEEE, vol. 2, Jun. 2003, pp. 1-9.
Rhames et al., "Autonomous selection of PDE inpainting techniques vs. exemplar inpainting techniques for void fill of high resolution digital surface models", SPIE, vol. 6564, No. 1, Apr. 2007, pp. 1-2.
Wecker et al, "Contextual void patching for digital elevation models", The Visual Computer, vol. 23, No. 9-11, Jun. 2007, pp. 1-10.

* cited by examiner

*Primary Examiner* — David Silver
(74) *Attorney, Agent, or Firm* — Allen, Dyer, Doppelt, Milbrath & Gilchrist, P.A.

(57) ABSTRACT

A geospatial modeling system may include a geospatial model data storage device and a processor cooperating therewith for determining a void within a geospatial model data set defining a void boundary region, and selecting at least one raw fill region from within the geospatial model data set for filling the void. The processor may also cooperate with the geospatial model data storage device for adjusting elevation values of the at least one raw fill region based upon elevation differences between corresponding portions of the void boundary region and the at least one raw fill region, and updating the geospatial model based upon the adjusted elevation values of the at least one raw fill region.

18 Claims, 9 Drawing Sheets

GEOSPATIAL MODELING SYSTEM USING VOID FILLING AND RELATED METHODS

FIELD OF THE INVENTION

The present invention relates to the field of data modeling, and, more particularly, to modeling systems such as geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example.

Another similar system from Harris Corp. is LiteSite®. LiteSite® models provide automatic extraction of ground, foliage, and urban digital elevation models (DEMs) from LIDAR and IFSAR imagery. LiteSite® can be used to produce affordable, geospatially accurate, high-resolution 3-D models of buildings and terrain.

U.S. Pat. No. 6,654,690 to Rahmes et al., which is also assigned to the present Assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In many instances there will be voids or gaps in the data used to generate a geospatial or other model. The voids negatively affect the quality of the resulting model, and thus it is desirable to compensate for these voids while processing the data, if possible. Various interpolation techniques are generally used for filling in missing data in a data field. One such technique is sinc interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficultly in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an exemplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

With respect to geospatial models such as DEMs, various approaches have been attempted to address error recognition and correction due to voids, etc. One such approach is set forth in an article by Gousie entitled "Digital Elevation Model Error Detection and Visualization," 4th ISPRS Workshop on Dynamic & Multi-dimensional GIS (Pontypridd, Wales, UK, 2005), C. Gold, Ed., pp. 42-46. This paper presents two methods for visualizing errors in a DEM. One method begins with a root mean square error (RMSE) and then highlights areas in the DEM that contain errors beyond a threshold. A second method computes local curvature and displays discrepancies in the DEM. The visualization methods are in three dimensions and are dynamic, giving the viewer the option of rotating the surface to inspect any portion at any angle.

Another example is set forth in an article by Grohman et al. entitled "Filling SRTM Voids: The Delta Surface Fill Method," Photogrammetric Engineering & Remote Sensing, March 2006, pp. 213-216. This article discusses a technique for fillings voids in SRTM digital elevation data is that is intended to provide an improvement over traditional approaches, such as the Fill and Feather (F&F) method. In the F&F approach, a void is replaced with the most accurate digital elevation source ("fill") available with the void-specific perimeter bias removed. Then the interface is feathered into the SRTM, smoothing the transition to mitigate any abrupt change. It works optimally when the two surfaces are very close together and separated by only a bias with minimal topographic variance. The Delta Surface Fill (DSF) process replaces the void with fill source posts that are adjusted to the SRTM values found at the void interface. This process causes the fill to more closely emulate the original SRTM surface while still retaining the useful data the fill contains.

Despite the advantages such prior art approaches may provide in certain applications, further advancements may be desirable for error detection and correction in geospatial and other model data.

SUMMARY OF THE INVENTION

In view of the foregoing background, it is therefore an object of the present invention to provide a geospatial modeling system having enhanced error correction features and related methods.

This and other objects, features, and advantages are provided by a geospatial modeling system which may include a geospatial model data storage device and a processor cooperating therewith for determining a void within a geospatial model data set defining a void boundary region, and selecting at least one raw fill region from within the geospatial model data set for filling the void. The processor may also cooperate with the geospatial model data storage device for adjusting elevation values of the at least one raw fill region based upon elevation differences between corresponding portions of the void boundary region and the at least one raw fill region, and updating the geospatial model data set based upon the adjusted elevation values of the at least one raw fill region.

More particularly, the corresponding portions of the void boundary region and the raw fill region may be overlapping. Also, the processor may further generate a differential surface for the corresponding portions of the void boundary region and the raw fill region based upon the elevation differences, and adjust the elevation values of the raw fill region based upon the differential surface. By way of example, the at least one raw fill region may comprise a single raw fill region to fill the void at once in some embodiments, as well as a plurality of raw fill regions to iteratively fill the void in other embodiments. The geospatial modeling system may further include a display, and the processor may cooperate with the geospatial model data storage device and the display to display the updated geospatial model data.

A geospatial modeling method may include determining a void within a geospatial model data set defining a void boundary region, and selecting at least one raw fill region from within the geospatial model data set for filling the void. The method may further include adjusting elevation values of the at least one raw fill region based upon elevation differences between corresponding portions of the void boundary region and the at least one raw fill region, and updating the geospatial model data set based upon the adjusted elevation values of the at least one raw fill region.

A related computer-readable medium is also provided. The computer-readable medium may have computer-executable instructions for causing a computer to perform steps comprising determining a void within a geospatial model data set defining a void boundary region, selecting at least one raw fill region from within the geospatial model data set for filling the void, adjusting elevation values of the at least one raw fill region based upon elevation differences between corresponding portions of the void boundary region and the at least one raw fill region, and updating the geospatial model data set based upon the adjusted elevation values of the at least one raw fill region.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
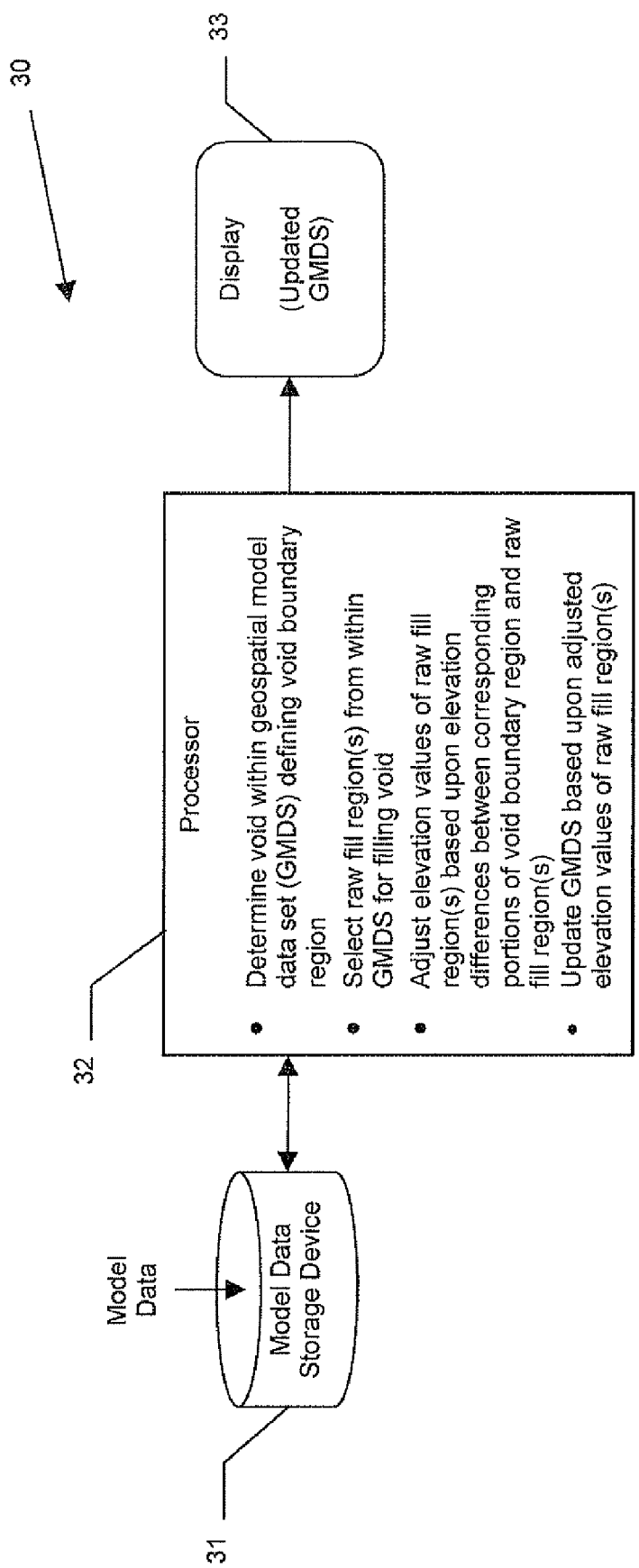
FIG. 1 is a schematic block diagram of a geospatial modeling system in accordance with the invention.
Figure 2:
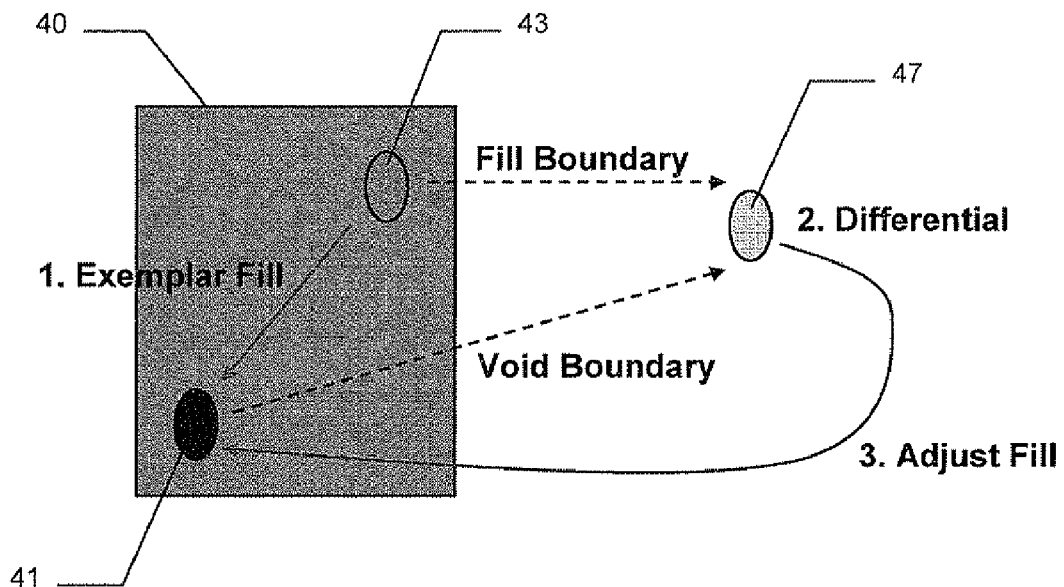
FIG. 2 is a schematic geospatial model data set (GMDS) demonstrating void filling using a single raw fill region by the system of FIG. 1.

Referring initially to FIG. 1, a geospatial modeling system 30 illustratively includes a geospatial model data storage device 31, a processor 32, and a display 33. The geospatial model data storage device 31 stores geospatial model data, such as digital elevation model (DEM), digital surface model (DSM), and/or triangulated irregular network (TIN) data, for example. Generally speaking, such model data is generated from "raw" data captures, such as LIDAR, synthetic aperture radar (SAR), photography, electro-optical, infrared, etc., using systems such as the above-noted RealSite® and LiteSite® site modeling systems, as will be appreciated by those skilled in the art. Geospatial model data sets may be generated by another source and provided to the processor 32 for the additional processing operations to be described below, or the processor may generate the geospatial model data set (i.e., from the raw data) in other embodiments.

By way of example, the processor 32 may be a central processing unit (CPU) of a PC, Mac, Sun, or other computing workstation. A display 33 may be coupled to the processor 32 for displaying modeling data. The processor 32 may advantageously reconstruct or repair corrupted geospatial model data by inpainting or filling voids in the data, as will be discussed further below. While processor 32 is illustratively shown and described herein as a single element, those skilled in the art will appreciate that the various functions of the processor set forth below may be implemented with a combination of hardware and software, and that these software components may be included in the same overall software application, for example.

Figure 6:
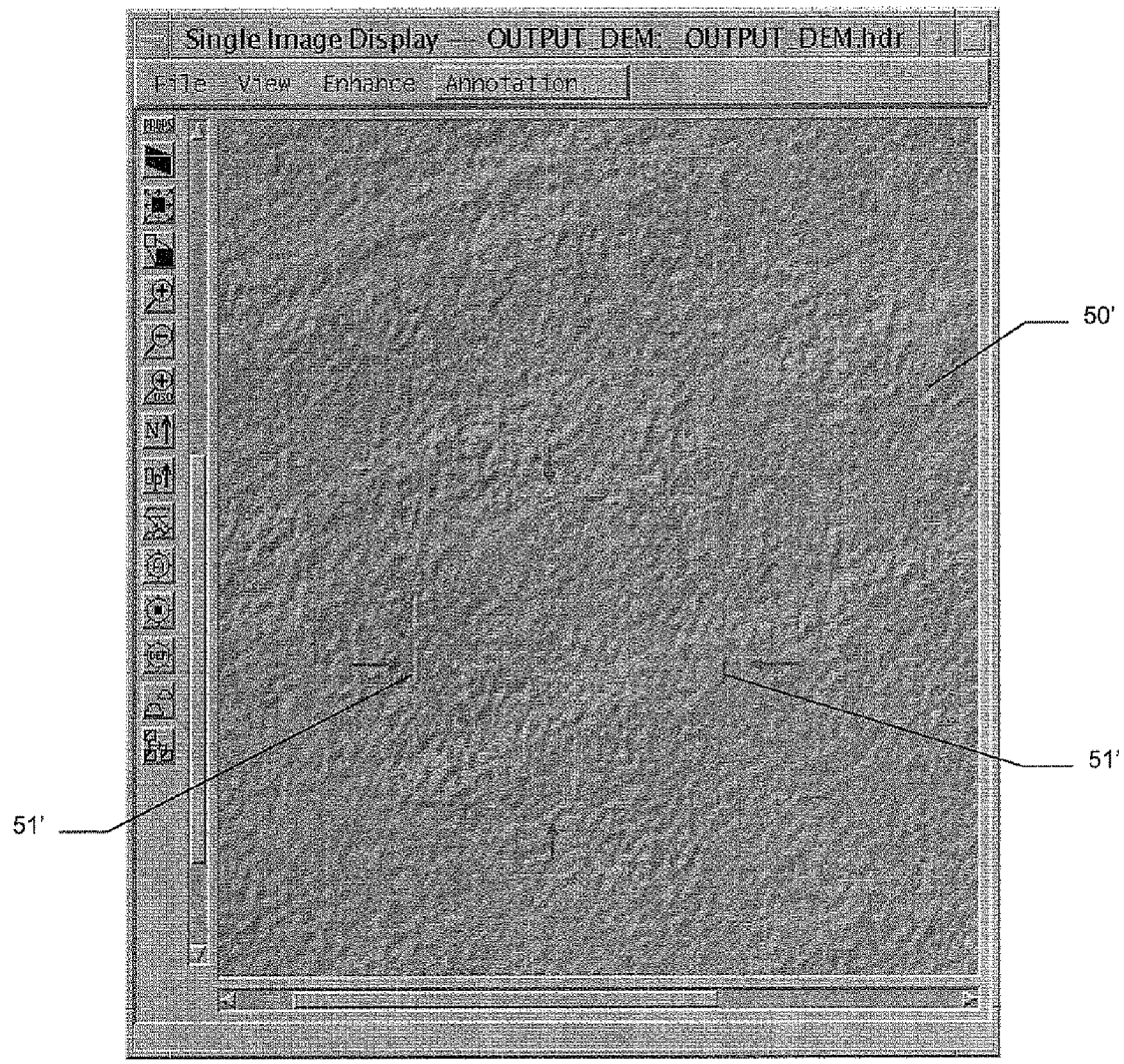
FIG. 6 is a screen print of the GMDS of FIG. 5 after void filling using an all-at-once (single fill) without updating of fill elevation values.
Figure 7:
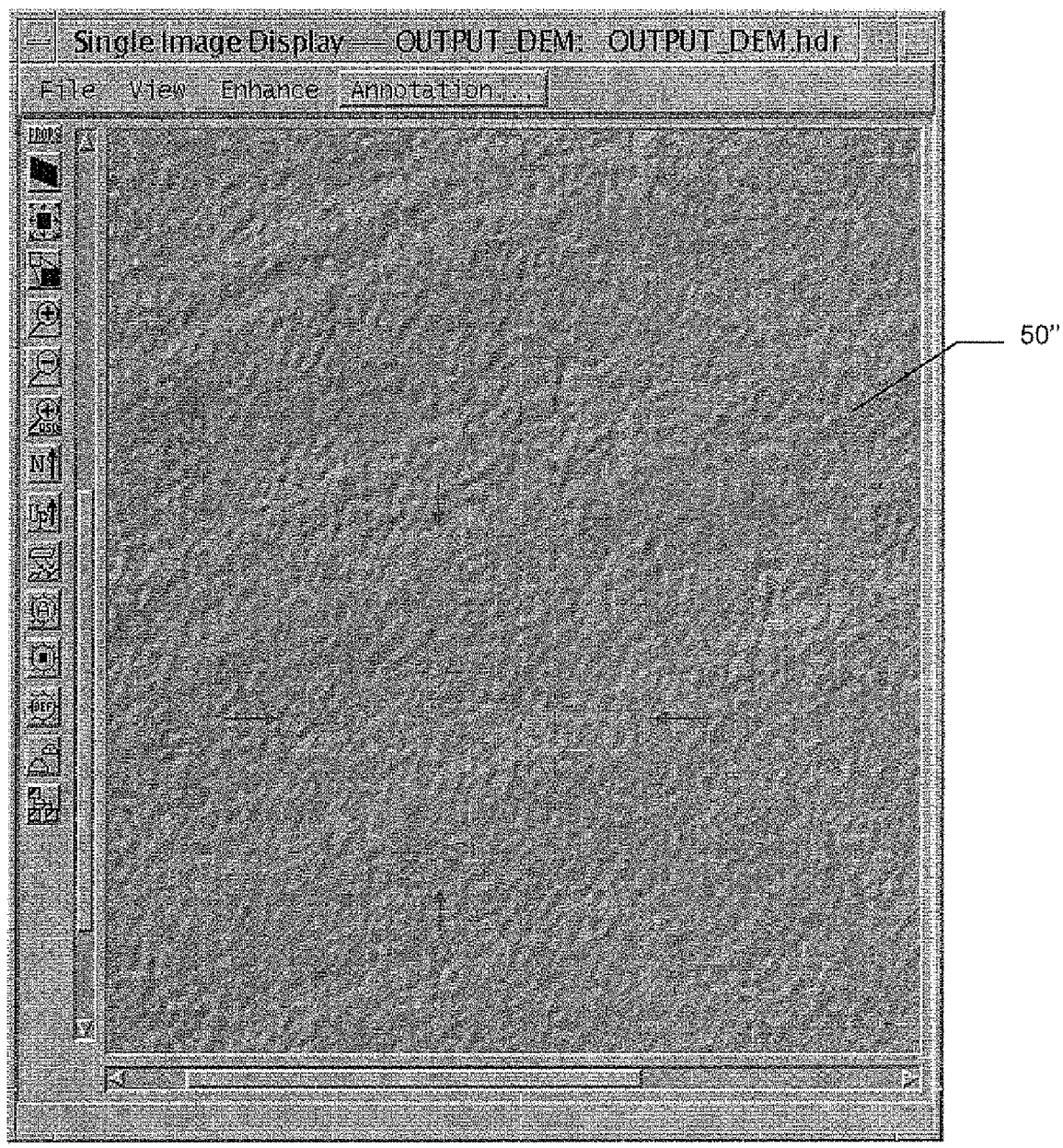
FIG. 7 is a screen print of the GMDS of FIG. 5 after void filling using an all-at-once (single fill) approach with updated fill elevation values.
Figure 8:
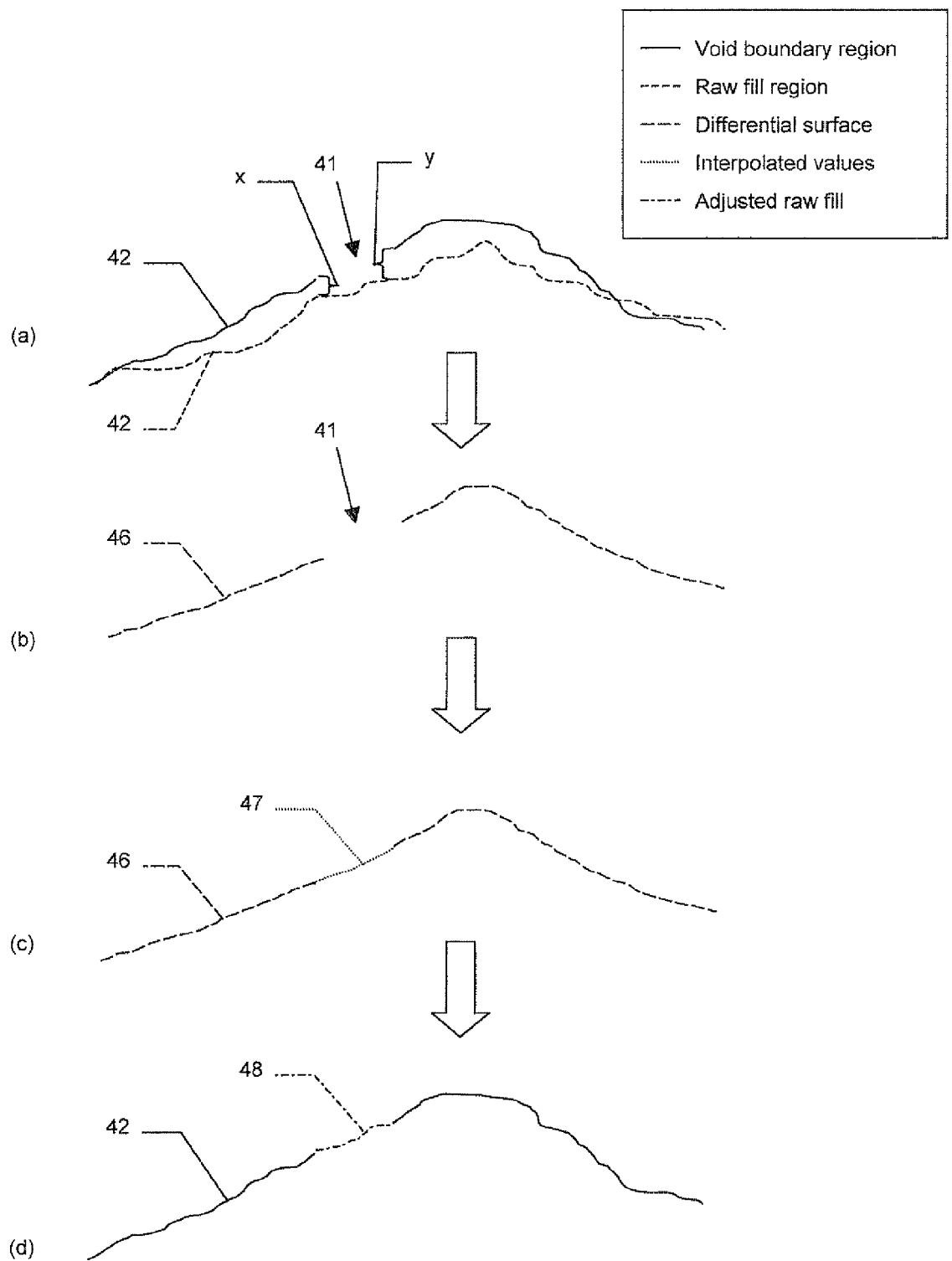
FIGS. 8($a$)-8($d$) are a series of 2D GMDS views illustrating a differential surface void filling method in accordance with the invention.

Referring now additionally to FIGS. 2-10, beginning at Block 90 the processor 32 may advantageously cooperate with the geospatial model data storage device 31 for determining a void 41 within a geospatial model data set 40 (e.g., DEM, etc.) defining a void boundary region 42 (FIG. 8($a$)), at Block 91. More particularly, the void boundary region 42 includes the portion of the geospatial model data set 40 surrounding or immediately adjacent to the void 41. As discussed above, it will in many circumstances be desirable to fill voids within a DEM or other geospatial model data set. Using an exemplar inpainting approach for void filling that allows an entire void region to be filled all-at-once (i.e., using a single fill or "patch") can be very efficient and lead to less chance for discrepancies between adjacent portions. However, while this approach is relatively fast and does typically preserve desired texture, this approach also commonly results in edge effects or artifacts 51' on the boundaries of the void (see FIG. 6). This results from not being able to find a candidate or raw fill region 43 that substantially identically matches the void (or target) region 41.

When a single source or raw fill region 43 match cannot be found when searching to fill the entire void 41 all-at-once, the void may be iteratively filled using a plurality of raw fill regions or patches, preferably one patch at a time (although other numbers are also possible). In this case, the chance for visible seams or artifacts 51' between each patch may be even more problematic than with a single patch. However, the desired experience is for the user to not be able to tell from the final product which areas have been filled. That is, it is desirable for there to be little or no visible artifacts 51' in the final displayed version of the DEM 40. Yet, an important consideration in removing boundary artifacts 51' is how to remove such artifacts in a way that does not disrupt the texture of the resulting DEM 40. Moreover, because artifacts 51' at boundaries can be significant, a post-filling smoothing operation to address the artifacts may require significant disruption of the appearance of the filled data (i.e., the texture) to alleviate the discrepancy.

In accordance with one advantageous aspect, the processor 32 selects one or more raw fill regions 43 from within the geospatial model data set 40 for filling the void 41, at Block 92. More particularly, the processor 32 may determine whether a single, suitable candidate fill region 43 exists within the data set 40 to fill the void 41. This determination may be made by determining whether a single candidate fill region 43 provides a threshold level of accuracy or error correction. By way of example, the error threshold may be established by a customer specification, and an error level may be determined using a root mean square error (RMSE) approach, etc., as will be appreciated by those skilled in the art. Further details on an exemplary error determination approach are provided in co-pending U.S. patent application Ser. No. 11/863,377, which is assigned to the present Assignee and is hereby incorporated herein in its entirety by reference.

Figure 3:
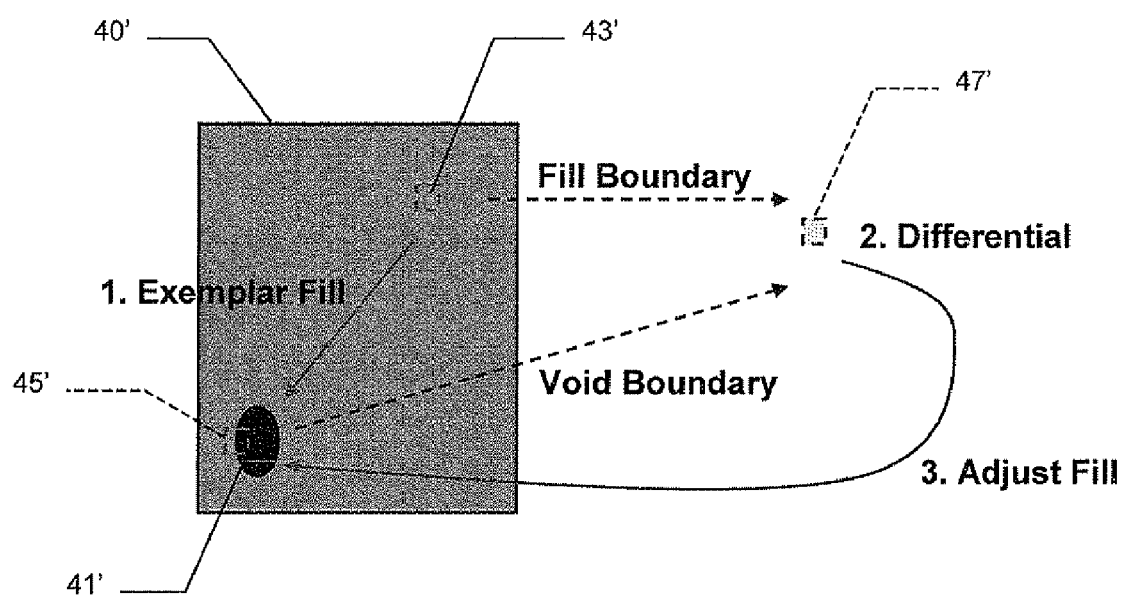
FIGS. 3 and 4 are schematic GMDS's demonstrating iterative void filling using a plurality of raw fill regions by the system of FIG. 1.
Figure 4:
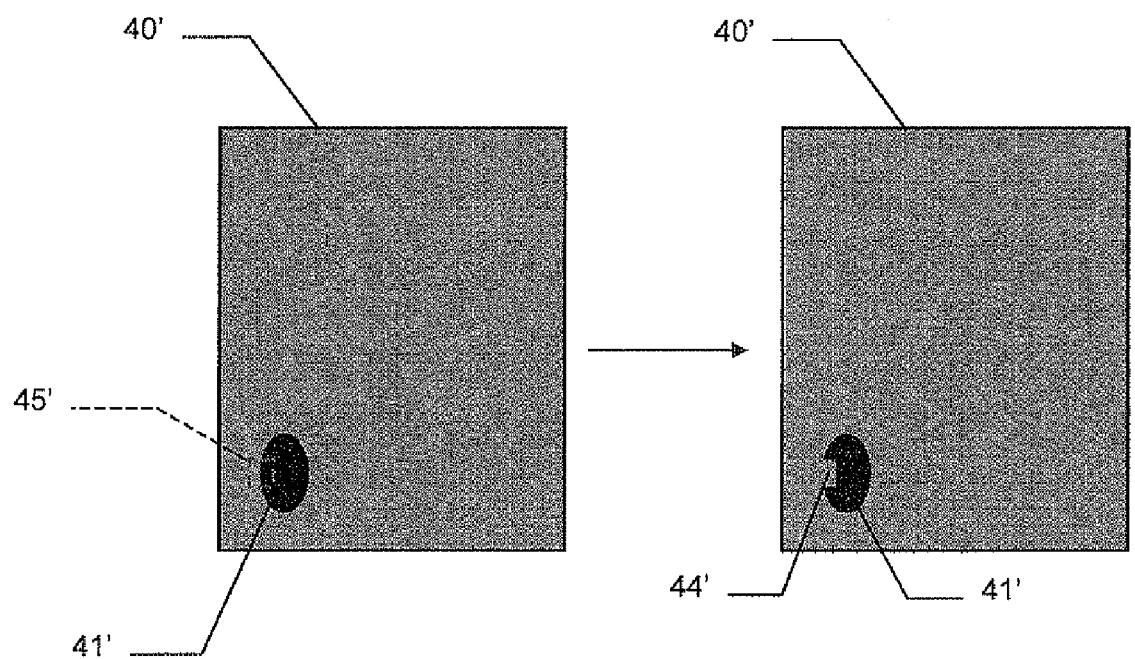

If a single raw fill region 43 does not meet the specified error threshold for a given geospatial model data set, then the processor 32 may proceed to instead fill the void 41' iteratively, i.e., one patch or fill region 43' at a time, as shown in FIGS. 3 and 4. While various approaches may be used to determine which target portion 45' of the void 41' to fill first, one approach is to select a top priority patch, i.e., to fill the target portion having a corresponding fill region 43' associated therewith with a least error based upon the void boundary, etc., as will be appreciated by those skilled in the art. Stated alternatively, the fill region 43' with the "best fit" for a given target portion 45' is used first. Subsequent patches (i.e., fill regions 43) may be chosen in a similar manner.

Figure 9:
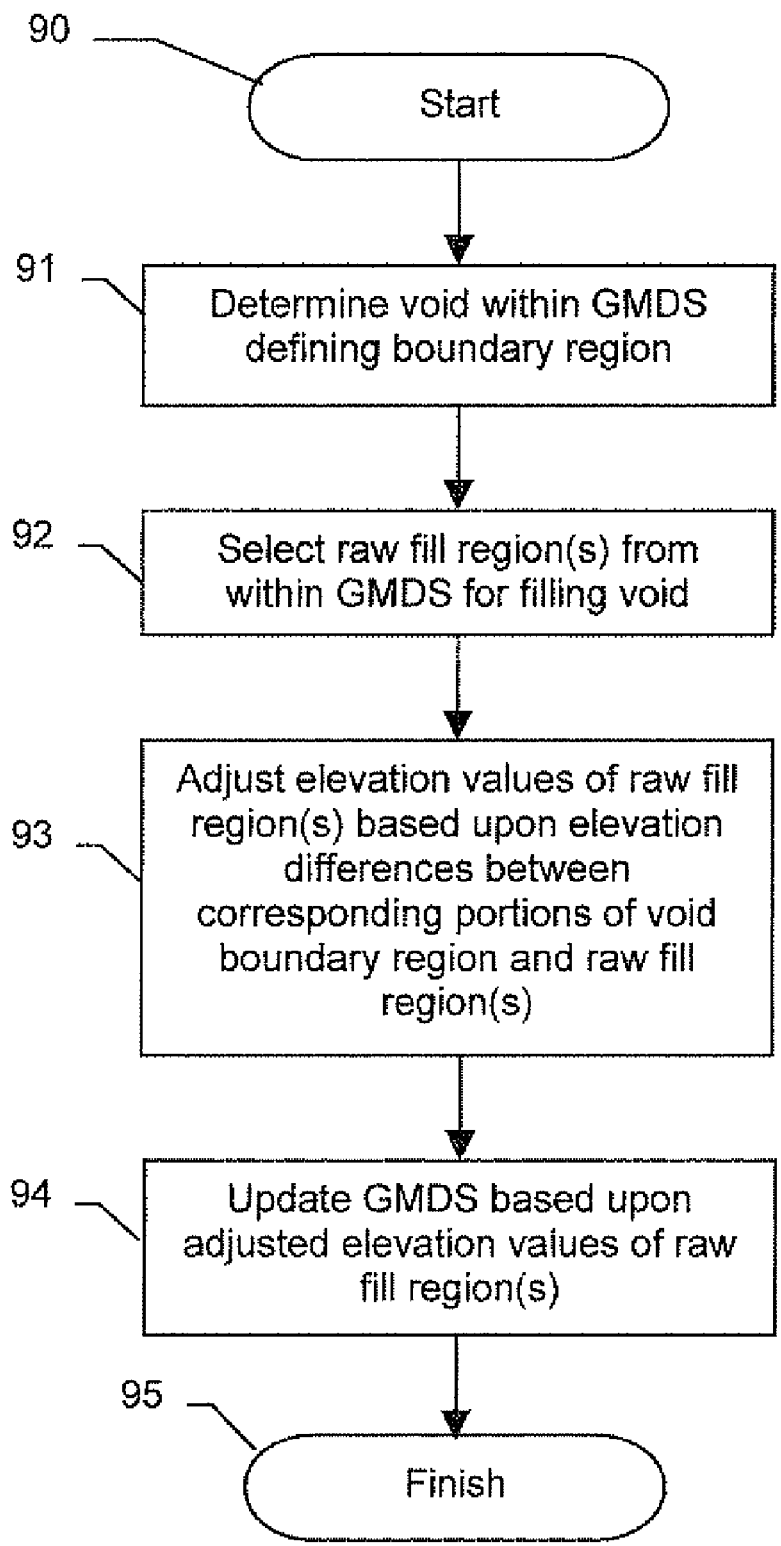
FIGS. 9 and 10 are flow diagrams illustrating geospatial model data set void filling method aspects of the invention.
Figure 10:
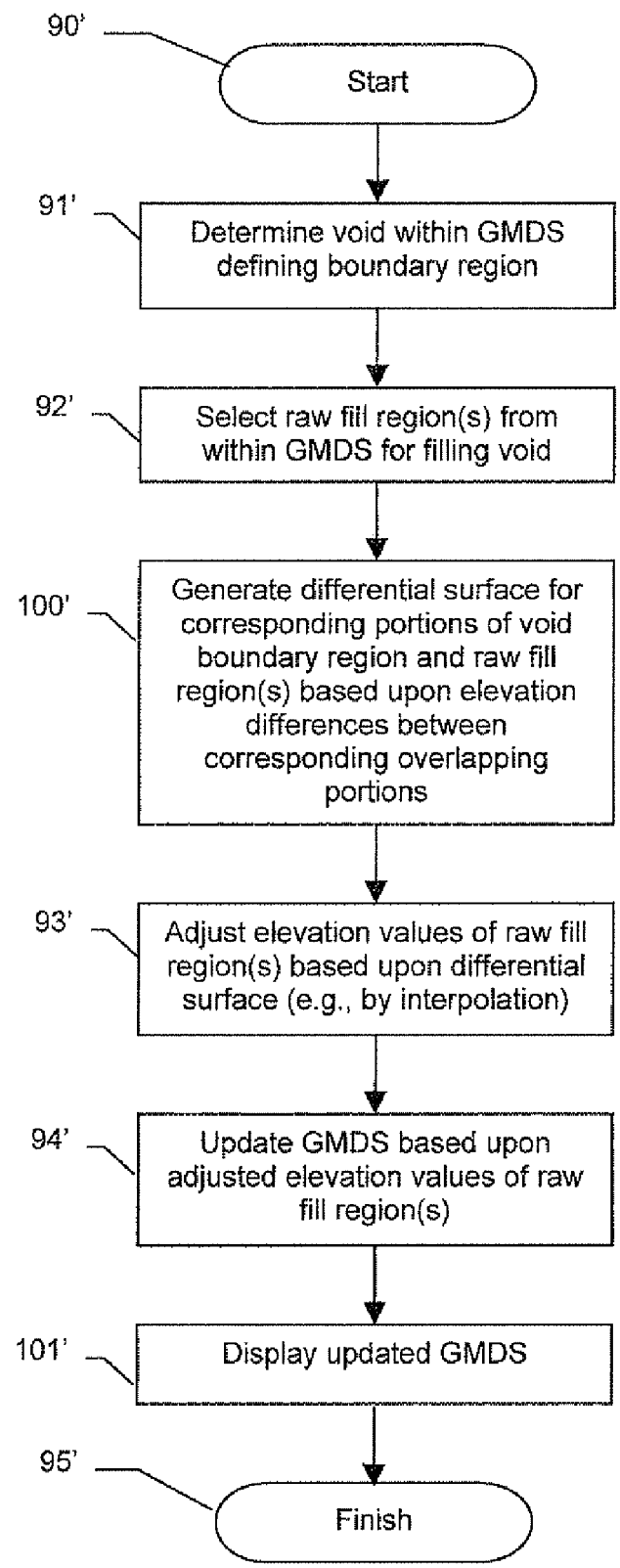

Once either an "all-at-once" fill region 43 or a partial fill region 43' is selected, the processor 32 then adjusts elevation values of the selected raw fill region based upon elevation differences between corresponding portions of the void boundary region 42 and the raw fill region, at Block 93, and updates the geospatial model data set 40 based upon the adjusted elevation values of the raw fill region, at Block 94, thus concluding the method illustrated in FIG. 9 (Block 95) The foregoing will now be further described with reference to the example illustrated in FIGS. 8(a)-8(d), which is a 2D geospatial model data set representation. The 2D representation is provided for clarity of illustration of the steps discussed herein, but it will be appreciated by those skilled in the art that these steps may also be performed over the 3D surface area of the void 41, i.e., to fill the entire void and not just a 2D cross-section thereof.

It should be noted that, as used herein, "3D" is meant to cover both true three-dimensional model data as well as so-called 2½ or 2.5D model data. More specifically, many DEMS or other geospatial model data sets are sometimes referred to as "2.5D" because they include rendered building walls, etc. that are not necessarily present in the original data capture, and thus do not provide a completely accurate 3D image as it would appear to the human eye upon viewing a scene. However, for clarity of discussed "3D" is meant to cover both cases herein.

As seen in FIG. 8(a), the processor 32 compares overlapping portions of the void boundary region 42 and the raw fill region 43 to determine differences therebetween. Stated alternatively, upon overlaying the raw fill region 43 on the void boundary region 42, the processor 32 can determine differences between the two at the void boundary. By way of example, if the geospatial model data set 40 is mapped to a grid with spaced-apart posts, corresponding posts are aligned between the void boundary region 42 and the raw fill region 43, as will be appreciated by those skilled in the art. Here, on the left hand void boundary there is an elevation difference x, and on the right hand boundary there is an elevation difference y, as shown.

At this point, differences between the void boundary region 42 and the raw fill region 43 within the void 41 cannot be determined, as there is no data available for the void boundary region at posts within the void (i.e., they are null points). The processor 32 therefore advantageously generates a differential surface 46 along the length of the void boundary region 42 based upon differences between the void boundary region and the raw fill region 43 at each corresponding or overlapping post. For example, the processor 42 may take the average of the two elevation values at a given post, and use the average value to generate the differential surface 46 with the void 41 remaining therein (Block 100'), as seen in FIG. 8(b).

The values for the posts in the differential surface 46 that correspond to the null posts in the void 41 are then determined or generated by interpolation to provide an interpolated fill 47 for the void 41, as seen in FIG. 8(c). Once the interpolated fill 47, which provides interpolated or estimated difference values between the void boundary region 42 and the raw fill region 43 within the void 41, is determined, the elevation values of the raw fill region for the posts within the void are adjusted to provide adjusted elevation values based upon the interpolated differential surface 47. The adjusted values are represented as an adjusted fill region 48 in FIG. 8(d).

Further, the data set 40 is updated accordingly (i.e., the void 41 is filled accordingly), as seen in FIG. 8(d), and displayed on the display 33 for the user (Block 101') as needed. More particularly, the values are increased or decreased accordingly by the interpolated fill 47 value at the corresponding post, as will be appreciated by those skilled in the art (Block 93'). It should be noted that the processor 32 need not actually generate the differential surface 46 and interpolated fill 47 for display to the user, even though visual representations thereof are provided in FIGS. 8(a)-8(d) for reference.

In those cases where a suitable single raw fill region 43 is not available, the processor 32 may choose smaller raw fill regions 43' to iteratively fill the void 41, as noted above, using the same technique just described but for the smaller raw fill regions. After a raw fill region 43' has been filled in the void creating a new portion 44' therein, the new portion may now be treated as "truth" data, i.e., just like it was part of the original void boundary region. This allows subsequent raw fill regions 43' to be similarly adjusted to reduce interior edge effects or artifacts between fill regions.

Figure 5:
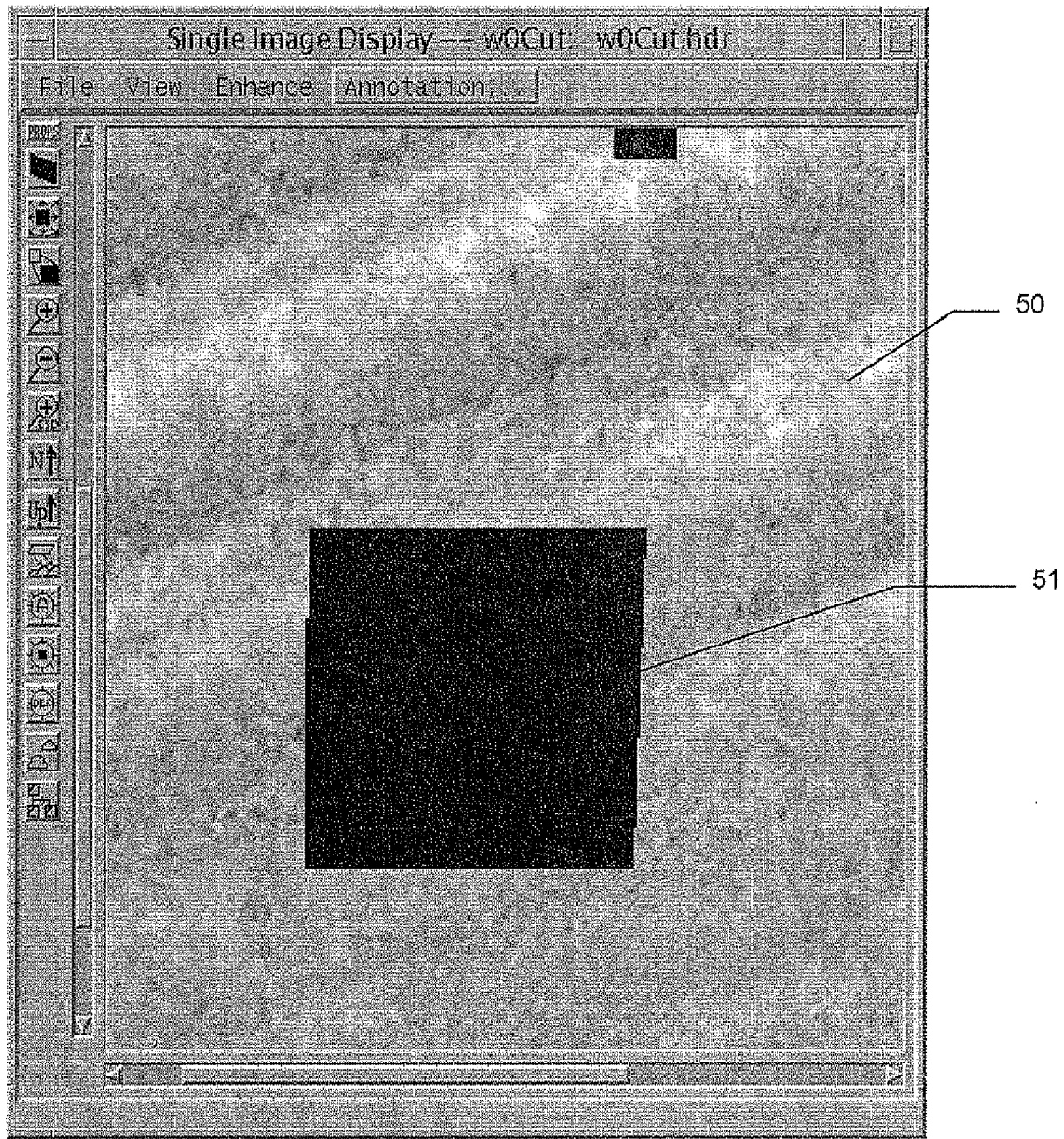
FIG. 5 is a screen print of a GMDS with a void therein.

The results of the above-described approach for an all-at-once exemplar inpainting operation are illustrated in FIGS. 5-7. A magnified view of a DEM 50 is shown in FIG. 5 with a void 41 therein. For comparison purposes, in FIG. 6 the void 51 has been filled all-at-once using a single raw fill region from within the DEM 50 to generate the updated DEM 50'. As can be seen, artifacts 51' appear at the intersection of the void boundary region and the raw fill region (i.e., patch), as indicated by the arrows. However, as seen in FIG. 7, when the differential surface approach described above is used, there is a decrease in artifacts at the intersection of the void boundary region and the raw fill region, which is again indicated by arrows.

One significant advantage of the above-described approach is that it utilizes a fill region(s) from within the same geospatial model data set with the void(s), so that there may be no need to provide a second, often expensive (and potentially time consuming to acquire) alternative fill source from which to take the raw fill region. This may provide significant time and production costs savings. Moreover, this approach is flexible enough to allow both all-at-once and iterative exemplar inpainting, so that users have more options depending on speed and accuracy constraints for a given processor. That is, an all-at-once approach may provide quicker results, while the iterative approach may provide more accurate fills, particularly if relatively small patch or raw fill region 43' sizes are used, as will be appreciated by those skilled in the art. Further, accurate and efficient fills may be provided with little or no artifacts or edge effects that often result with exemplar inpainting operations.

The above-noted geospatial model method aspects may also be embodied in a computer-readable medium having computer-executable instructions for causing a computer or processor to perform the steps set forth above, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial model data storage device; and
a processor cooperating with said geospatial model data storage device and configured to
determine a void within a geospatial model data set defining a void boundary region, the geospatial model data set being generated based upon a single raw data capture,
select at least one raw fill patch region from within the geospatial model data set for filling the void, the at least one raw fill patch region being from the same single raw data capture in which the void is present,
adjust elevation values of the at least one raw fill patch region based upon elevation differences between corresponding portions of the void boundary region and the at least one raw fill patch region, and
update the geospatial model data set based upon the adjusted elevation values of the at least one raw fill patch region so that the void is filled entirely based upon raw fill data from within the same single raw data capture in which the void is present.

2. The geospatial modeling system of claim 1 wherein the corresponding portions of the void boundary region and the raw fill patch region are overlapping.

3. The geospatial modeling system of claim 1 wherein said processor is further configured to generate a differential surface for the corresponding portions of the void boundary region and the raw fill patch region based upon the elevation differences, and adjust the elevation values of the raw fill patch region based upon the differential surface.

4. The geospatial modeling system of claim 1 wherein the at least one raw fill patch region comprises a single raw fill region to fill the void at once.

5. The geospatial modeling system of claim 1 wherein the at least one raw fill patch region comprises a plurality thereof to iteratively fill the void.

6. A geospatial modeling system comprising:
a geospatial model data storage device; and
a processor cooperating with said geospatial model data storage device and configured to
determine a void within a geospatial model data set defining a void boundary region, the geospatial model data set being generated based upon a single raw data capture,
select at least one raw fill patch region from within the geospatial model data set for filling the void, the at least one raw fill patch region being from the same single raw data capture in which the void is present,
generate a differential surface for corresponding portions of the void boundary region and the at least one raw fill patch region based upon elevation differences between the corresponding overlapping portions,
adjust elevation values of the at least one raw fill patch region based upon the differential surface, and
update the geospatial model data set based upon the adjusted elevation values of the at least one raw fill patch region so that the void is filled entirely based upon raw fill data from within the same single raw data capture in which the void is present.

7. The geospatial modeling system of claim 6 wherein the at least one raw fill patch region comprises a single raw fill region to fill the void at once.

8. The geospatial modeling system of claim 6 wherein the at least one raw fill patch region comprises a plurality thereof to iteratively fill the void.

9. A geospatial modeling method comprising:
determining a void within a geospatial model data set defining a void boundary region using a processor, the geospatial model data set being generated based upon a single raw data capture;
selecting at least one raw fill patch region from within the geospatial model data set for filling the void using the processor, the at least one raw fill patch region being from the same single raw data capture in which the void is present;
adjusting elevation values of the at least one raw fill patch region based upon elevation differences between corresponding portions of the void boundary region and the at least one raw fill patch region using the processor; and updating the geospatial model data set based upon the adjusted elevation values of the at least one raw fill patch region using the processor so that the void is filled entirely based upon raw fill data from within the same single raw data capture in which the void is present.

10. The geospatial modeling method of claim 9 wherein the corresponding portions of the void boundary region and the raw fill patch region are overlapping.

11. The geospatial modeling method of claim 9 further comprising generating a differential surface for the corresponding portions of the void boundary region and the raw fill patch region based upon the elevation differences using the processor; and where adjusting comprises adjusting the elevation values of the raw fill patch region based upon the differential surface.

12. The geospatial modeling method of claim 9 wherein the at least one raw fill patch region comprises a single raw fill region to fill the void at once.

13. The geospatial modeling system of claim 9 wherein the at least one raw fill patch region comprises a plurality thereof to iteratively fill the void.

14. A non-transitory computer-readable medium having computer-executable instructions for causing a computer to perform steps comprising:

determining a void within a geospatial model data set defining a void boundary region, the geospatial model data set being generated based upon a single raw data capture;

selecting at least one raw fill patch region from within the geospatial model data set for filling the void, the at least one raw fill patch region being from the same single raw data capture in which the void is present;

adjusting elevation values of the at least one raw fill patch region based upon elevation differences between corresponding portions of the void boundary region and the at least one raw fill patch region; and updating the geospatial model data set based upon the adjusted elevation values of the at least one raw fill patch region so that the void is filled entirely based upon raw fill data from within the same single raw data capture in which the void is present.

15. The non-transitory computer-readable medium of claim 14 wherein the corresponding portions of the void boundary region and the raw fill patch region are overlapping.

16. The non-transitory computer-readable medium of claim 14 further comprising generating a differential surface for the corresponding portions of the void boundary region and the raw fill patch region based upon the elevation differences; and where adjusting comprises adjusting the elevation values of the raw fill patch region based upon the differential surface.

17. The non-transitory computer-readable medium of claim 14 wherein the at least one raw fill patch region comprises a single raw fill region to fill the void at once.

18. The non-transitory computer-readable medium of claim 14 wherein the at least one raw fill patch region comprises a plurality thereof to iteratively fill the void.

* * * * *